United States Patent
Kaufman et al.

(10) Patent No.: US 7,836,723 B2
(45) Date of Patent: Nov. 23, 2010

(54) AIR CONDITIONING SYSTEM

(75) Inventors: Jonathan William Kaufman, Leonardtown, MD (US); Stephen M. Coleman, Lusby, MD (US); Ravikant T. Barot, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 421 days.

(21) Appl. No.: 12/136,288

(22) Filed: Jun. 10, 2008

(65) Prior Publication Data

US 2009/0301127 A1    Dec. 10, 2009

(51) Int. Cl.
*F25B 17/00* (2006.01)
(52) U.S. Cl. .................................. 62/480; 62/485
(58) Field of Classification Search .................. 62/94, 62/100, 101, 111, 434, 480, 483, 485, 236, 62/157
See application file for complete search history.

(56) References Cited

U.S. PATENT DOCUMENTS

| | | | | | |
|---|---|---|---|---|---|
| 3,581,514 | A | * | 6/1971 | Hamerski et al. | 62/93 |
| 3,774,374 | A | * | 11/1973 | Dufour et al. | 96/112 |
| 4,113,004 | A | * | 9/1978 | Rush et al. | 165/7 |
| 4,180,985 | A | * | 1/1980 | Northrup, Jr. | 62/94 |
| 4,197,714 | A | * | 4/1980 | Bradshaw | 62/94 |
| 5,732,569 | A | * | 3/1998 | Sanada et al. | 62/481 |
| 6,029,462 | A | * | 2/2000 | Denniston | 62/94 |
| 6,209,622 | B1 | * | 4/2001 | Lagace et al. | 165/8 |
| 6,240,742 | B1 | | 6/2001 | Kaufman et al. | |
| 6,932,148 | B1 | | 8/2005 | Brummett et al. | |
| 7,152,421 | B2 | | 12/2006 | Parks et al. | |
| 2003/0136140 | A1 | * | 7/2003 | Maeda et al. | 62/271 |
| 2005/0150378 | A1 | * | 7/2005 | Dunne et al. | 95/113 |
| 2005/0214609 | A1 | * | 9/2005 | McElroy | 429/26 |
| 2007/0028769 | A1 | * | 2/2007 | Eplee et al. | 95/113 |
| 2007/0079623 | A1 | * | 4/2007 | Inaba et al. | 62/260 |

OTHER PUBLICATIONS

Yong, Wang; Adsortion Refrigeration: A Survey of Novel Technologies; Recent Patents on Engineering 2007,1, p. 1-21.

* cited by examiner

*Primary Examiner*—Mohammad M Ali
(74) *Attorney, Agent, or Firm*—Mark O. Glut

(57) ABSTRACT

An air conditioning system that includes desiccant compartments for holding a desiccant; a heat exchanger, a blower and a vessel. The heat exchanger can be filled with a heat transfer medium, while the blower blows ambient air by the heat exchanger such that the blown air is cooled and the heat exchanger is warmed such that thermal energy increases and is transferred from the air to the heat transfer medium causing the heat transfer medium to turn into vapor. The vapor is then diffused to one of the desiccant compartments such that the vapor is adsorbed onto the desiccant creating a mixture. Then an energy source is applied to the mixture such that the vapor and desiccant are separated. The separated vapor is transported to the vessel where it is condensed and then sent back to the heat exchanger, such that the system is able to be continuously operating.

20 Claims, 4 Drawing Sheets

AIR CONDITIONING SYSTEM

STATEMENT OF GOVERNMENT INTEREST

The invention described herein may be manufactured and used by or for the Government of the United States of America for governmental purposes without payment of any royalties thereon or therefor. The technology described herein was a subject invention under Cooperative Research and Development Agreement NCRADA-NAWCADPAX-07-121-A01 with OxiCool, Inc.

BACKGROUND

The present invention relates to an air conditioning system. More specifically, but without limitation, the present invention relates to a closed loop continuously rechargeable solid adsorption air conditioning system.

When sleeping at night, drivers of large trucks that operate over long distances and travel for many days often utilize sleeper compartments built into their truck cabin. This reduces the cost of lodgings while allowing truckers to sleep in rest areas on highways, thereby eliminating the need to detour off their routes to find and return from overnight lodging. Maintaining comfortable cabin temperatures during warm evenings, however, often means running the truck engine throughout the night to power the truck air conditioner. This uses considerable fuel, decreases engine life by continual operation, provides a continual source of environmental pollutants, and diminishes driver health by exposing the driver to elevated levels of the pollutants during sleep. In addition, the continuous vibration increases mechanical fatigue on truck tractor components, thereby decreasing time between repairs. Not running a truck air conditioner can lead to increased driver fatigue due to poor sleep or increased operating costs (use of motels/hotels).

Military vehicles such as tanks or armored personnel carriers must also run vehicle engines or auxiliary power units to maintain internal air conditioning. Providing an auxiliary cooling system that does not rely on diesel fuel presents a smaller infrared signature and improves battlefield survivability.

Adsorption cooling has been known for several years, particularly units that utilize zeolite. The units tend to be very large, too large for use on vehicles, and take a long period of time to recharge. The zeolite and refrigerant must be cooled and typically this takes an extended period of time.

For the foregoing reasons, there is a need for an air conditioning system able to operate independently of a vehicle engine.

SUMMARY

The present invention is directed to an air conditioning system that meets the needs enumerated above and below.

The present invention is directed to an air conditioning system that includes at least two desiccant compartments for holding a desiccant; at least one heat exchanger, a blower, a refrigerant reservoir for holding refrigerant and a coolant reservoir for holding coolant. The blower is for blowing ambient air by the heat exchanger such that the blown air is cooled and the heat exchanger is warmed such that thermal energy increases and is transferred from the air to the refrigerant causing the refrigerant to turn into vapor, the vapor is then diffused to one of the desiccant compartments such that the vapor is adsorbed onto the desiccant creating a mixture. An energy source is applied to the mixture such that the vapor and desiccant are separated. The coolant is for cooling the desiccant after the vapor and desiccant are separated.

It is a feature of the present invention to provide an air conditioning system that is able to be utilized in a vehicle and is able to operate independently of a vehicle engine.

It is a feature of the present invention to provide an air conditioning system that will not utilize any toxic components.

It is a feature of the present invention to provide an air conditioning system that will reduce carbon emissions from vehicles employing the system, as well as reducing a vehicle's infrared signature.

It is a feature of the present invention to provide an air conditioning system that will improve driver health by reducing exposure to pollutants during sleep, extend the useful life of a truck engine, eliminate the release of air conditioner fluorocarbons, and reduce fuel consumption during truck operation.

It is a feature of the present invention to provide an eco-friendly air conditioning system that can operate effectively for an extended period of time.

It is an additional feature of the present invention to provide an air conditioning system that provides continuous cooling to an enclosed space utilizing a forced convection system based on desiccant based adsorption.

DRAWINGS

These and other features, aspects and advantages of the present invention will become better understood with reference to the following description and appended claims, and accompanying drawings wherein:

DESCRIPTION

Figure 1:
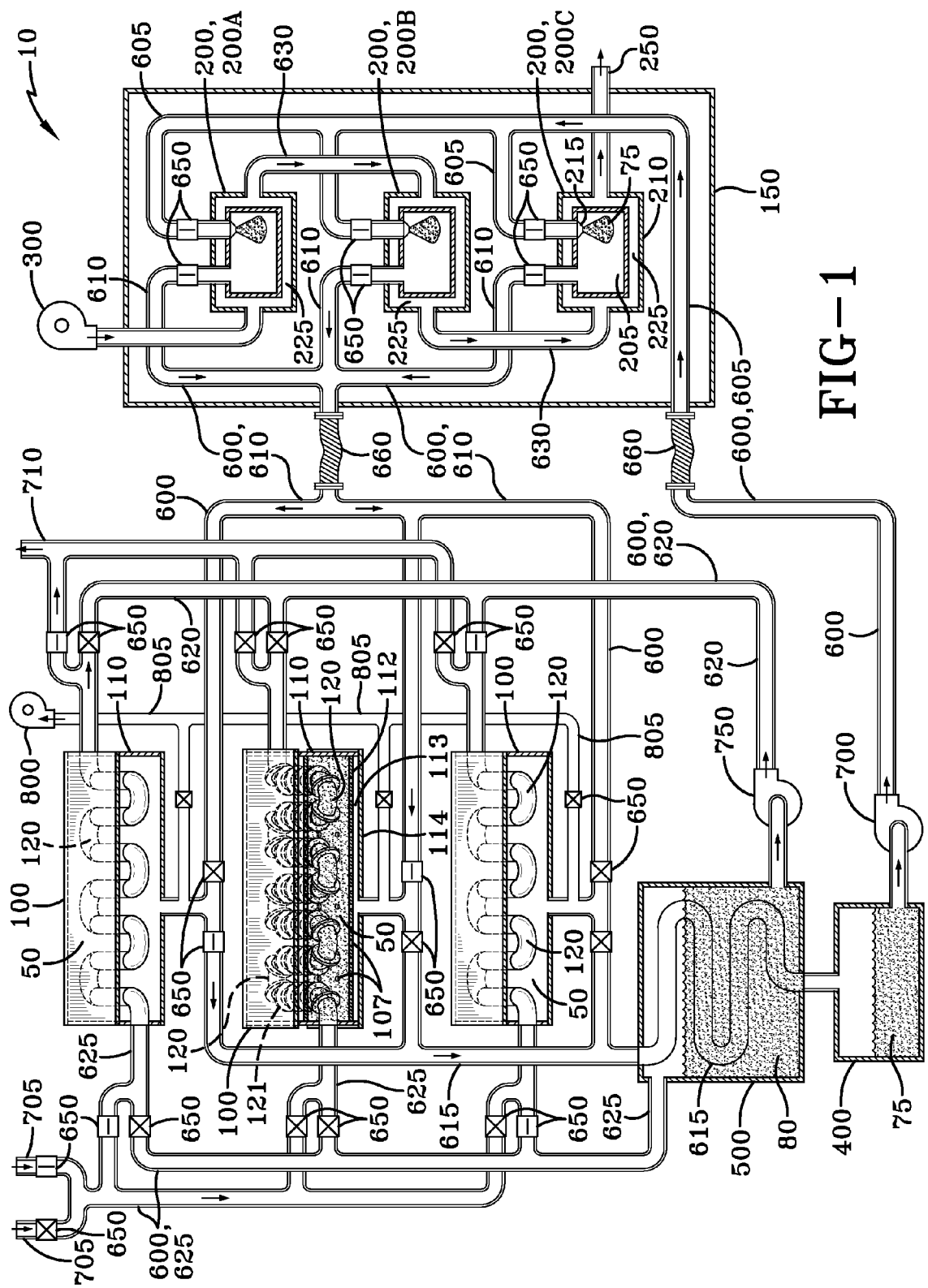
FIG. 1 is a side view of an embodiment of the air conditioning unit.

The preferred embodiments of the present invention are illustrated by way of example below and in FIGS. 1-4. The air conditioning system 10 includes at least two desiccant compartments 100 for holding a desiccant 50 (preferably three desiccant compartments 100), at least one heat exchanger 200 (preferably three heat exchangers 200), an air blower 300, a refrigerant reservoir 400 for holding refrigerant 75 and a coolant reservoir 500 for holding coolant 80. The heat exchangers 200 are able to be filled with a refrigerant 75. The blower 300 is for blowing ambient air by the heat exchangers 200 such that the blown air is cooled and the heat exchangers 200 are warmed such that thermal energy increases and is transferred from the air to the refrigerant 75 causing the refrigerant 75 to turn into vapor, the vapor is then diffused to one of the desiccant compartments 100 such that the vapor is adsorbed onto the desiccant 50 creating a mixture. An energy source, preferably heat, is applied to the mixture such that the vapor and desiccant 50 are separated. The separated or desorbed vapor is transported via piping into and through the coolant reservoir 500 where it is condensed, then the condensate is sent to the refrigerant reservoir 400, then sent back to the heat exchanger(s) 200, such that the system 10 is able to continuously operate. The coolant 80 is drawn from the coolant reservoir 500 and passes via piping into the desiccant compartment 100 such that the previously separated desiccant 50 is cooled.

In the description of the present invention, the invention will be discussed in a vehicle air cooling environment; however, this invention can be utilized for any type of application that requires use of an air conditioning system. The system 10 may be mounted on the rear of a truck sleeper compartment, at or near the undercarriage of the vehicle or any location or position practicable.

Figure 2:
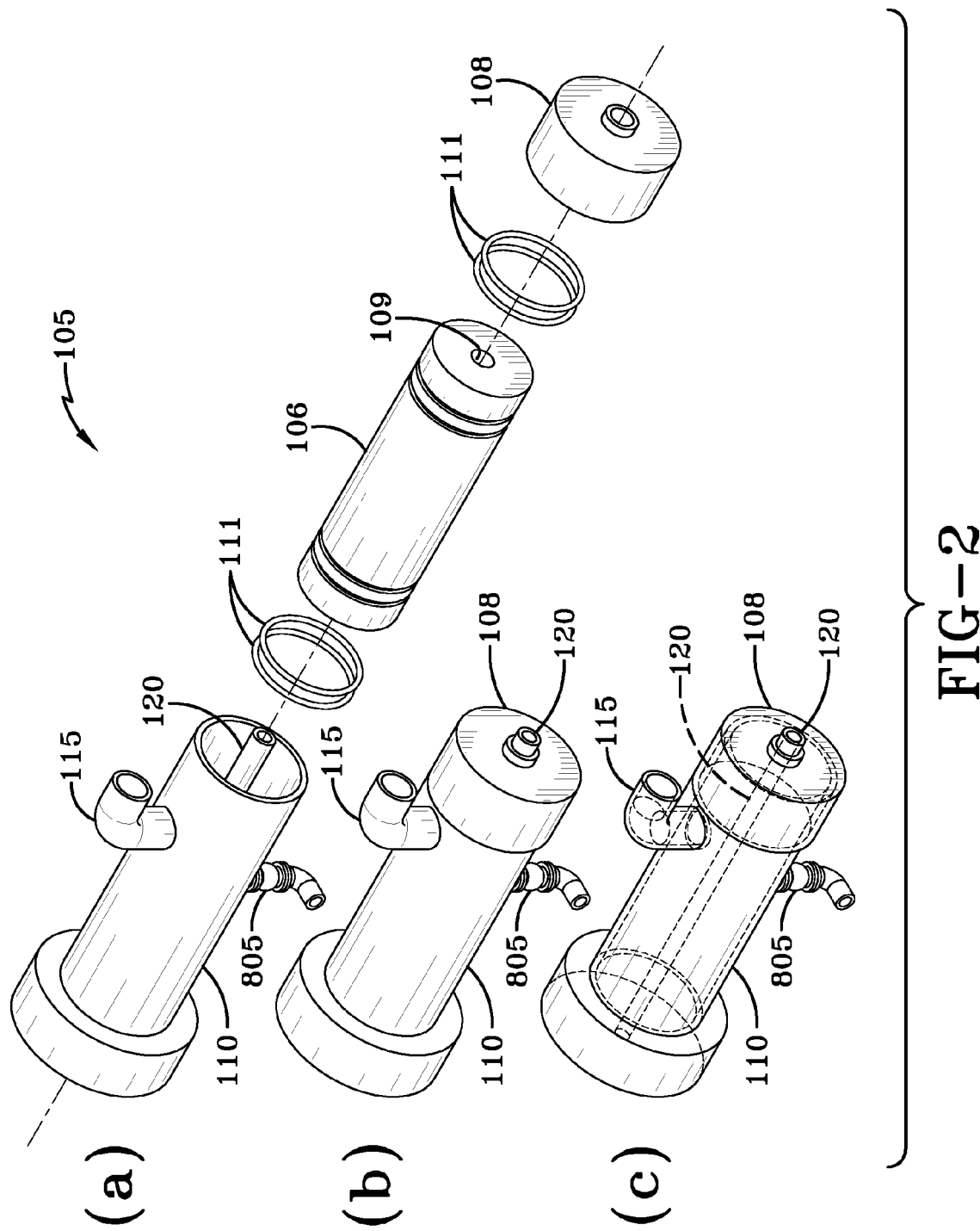
FIG. 2a is an exploded perspective view of another embodiment of the desiccant compartment.
FIG. 2b is a perspective view of that embodiment.
FIG. 2c is a perspective view showing the internal portion of that embodiment.

Each desiccant compartment 100 may be a tank, container, receptacle or structure for holding a solid, liquid or gas. The desiccant compartment 100 may be manufactured from any material practicable. FIG. 1 shows three desiccant compartments 100; however, the system 10 may utilize as little as two desiccant compartments 100 and as many as required or desired. The desiccant compartment 100 may include perforations 107 to facilitate the free and efficient movement of the vapor. The preferred desiccant compartment 100 includes a compartment wall 110 and compartment tubing 120. In one of the embodiments, the compartment wall 110 may include an outer skin 114 and an inner skin 112, which together create an air channel 113. The inner skin 112 may include the perforations 107 or utilize a sieve system to allow the vapor to flow freely into and out of the air channel 113. The compartment tubing 120 passes through the desiccant compartment 100 and can carry a cooling gas or liquid (coolant 80) for cooling the contents of the desiccant compartment 100 or hot gas or liquid (heat) for heating the contents of the desiccant compartment 100. The compartment tubing 120 does not allow intermixing of the contents of the compartment tubing 120 with the vapor and/or desiccant disposed within the desiccant compartment 100. The compartment tubing 120 may include valves to control the flow of any fluids in the compartment tubing 120. The compartment tubing 120 may be manufactured from any type of material that is practicable. The compartment tubing 120 may pass through the desiccant compartment 100 in a straight line or in a serpentine manner as shown in FIGS. 1 and 2. As shown in FIG. 1, the tubing may include fins 121 disposed around the circumference of the compartment tubing 120 to increase heat transfer.

Figure 3:
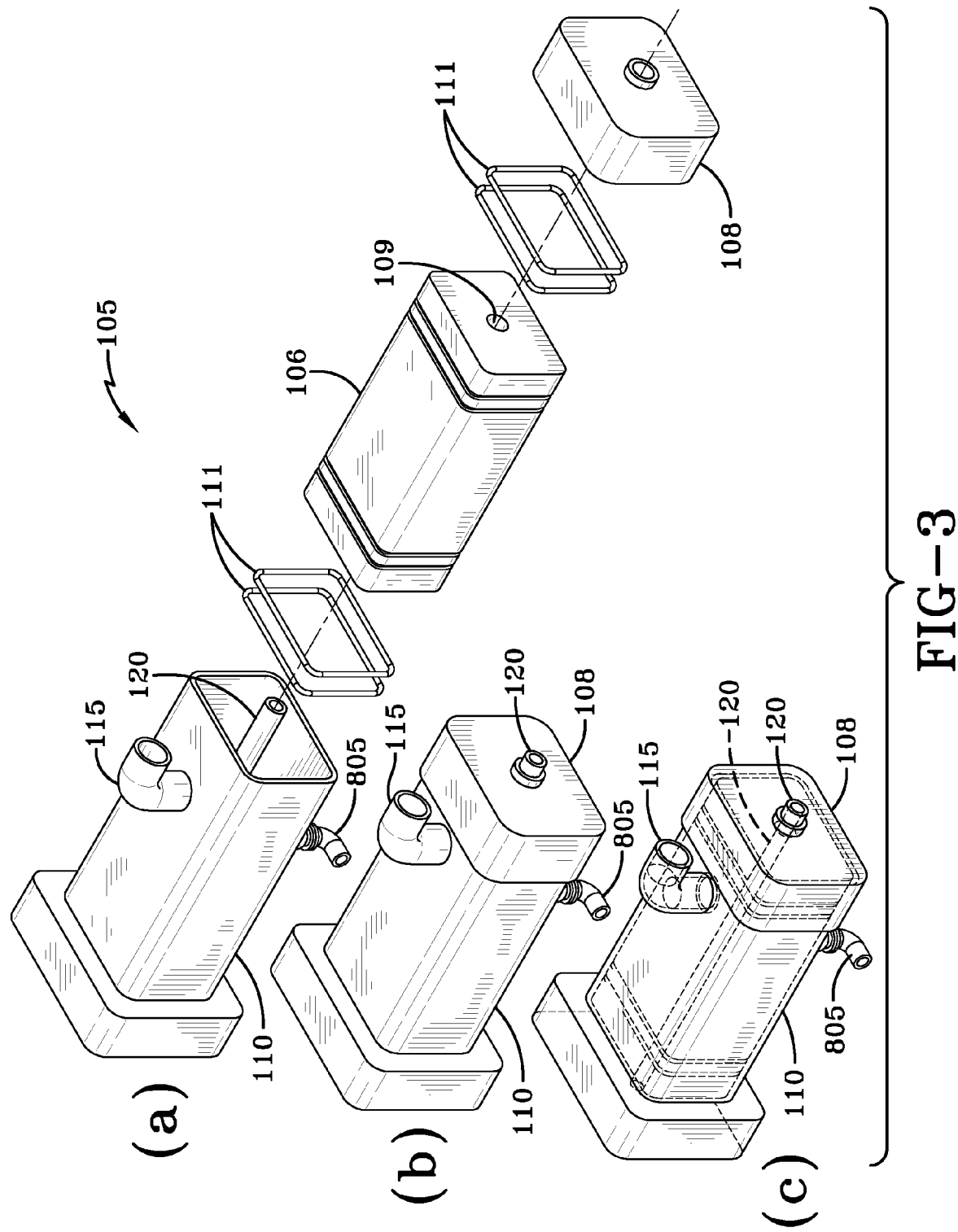
FIG. 3a is an exploded perspective view of another embodiment of the desiccant compartment.
FIG. 3b is a perspective view of that embodiment.
FIG. 3c is a perspective view showing the internal portion of that embodiment; and, FIG. 4 is a perspective view of the flexible tube.

The desiccant compartment 100 may be a replaceable desiccant cartridge 105 that can be easily removed or attached. The desiccant cartridge 105 may have a circular cross section, as shown in FIG. 2 or a rectangular or square cross section as shown in FIG. 3. As discussed earlier, the compartment tubing 120 within the desiccant cartridge 105 may be straight (FIGS. 2 and 3) or serpentine (FIG. 1). As shown in FIGS. 2 and 3, the desiccant cartridge 105 may include a compartment wall 110 or shell as previously described, a desiccant case 106 (containing the desiccant 50) disposed within the compartment wall 110, rings 111, a cap 108, and a compartment tubing aperture 109.

The system 10 may also include a vacuum pump 800 connected to the desiccant chambers 100 via vacuum piping 805 and valves 650. A vacuum pump 800 may be defined as any pump used to evacuate an enclosure. This vacuum pump 800 may be used to maintain the low pressure environment as and when required, or it can be used for drawing vacuum after a maintenance cycle.

A desiccant 50 may be defined as, but without limitation, as a drying agent. Examples of desiccant that can be utilized are amorphous silica gel, diatomaceous earth, calcium aluminosilicate clay, molecular sieves and activated carbon. The preferred desiccant is zeolite; however any type of desiccant that is practicable can be used. A zeolite may be described, but without limitation, as hydrous aluminum silicate in porous granules. Possible zeolites that can be utilized are, but without limitation, analcime, chabazite, heulandite, natrolite, phillipsite, and stilbite.

A heat exchanger 200 may be defined, but without limitation, as a cooler or a device used to transfer heat between two fluids or items without direct contact between them. The heat exchangers 200 may be manufactured from an aluminum alloy with an inner nickel coating; however, the heat exchangers 200 may be manufactured from any type of material practicable. The heat exchangers 200 along with any corresponding piping and valves may be calibrated such that they correspond with the number and size of the desiccant compartments 100. The heat exchangers 200 may be computer controlled. Each heat exchanger 200 may include a boiling chamber 205 and a shell 210. The boiling chamber 205 may hold the refrigerant 75, while the shell 210 is the outer covering of the heat exchanger 200 and creates an air passage 225 for the air being cooled to pass through. Each heat exchanger 200 may also include an injector or spray nozzle 215 for spraying refrigerant 75 into the boiling chamber 205 of the heat exchanger 200.

A refrigerant 75 and a coolant 80 may be defined, but without limitations, as a heat transfer medium, or fluid that supplies or carries away energy from an item, or the medium in which heat is being transferred and energy storage and conversion may occur. The refrigerant 75 and/or coolant 80 may be inert or reactive, single phase or multi-phase. The preferred refrigerant 75 and coolant 80 is water, however, air, oil, glycol, any combination of heat transfer media, or any type of heat transfer medium deemed practicable can be used.

The air blower 300 may be powered by an external or internal battery, electricity, an engine or by any practicable means. The air blower 300 may be any type of device that moves or displaces air or any type of fluid.

The refrigerant reservoir 400 and the coolant reservoir 500 may be a tank, container, receptacle or structure for holding a fluid. They may be manufactured from any material practicable.

The system 10 may also include associated piping 600 between each of the components, such as, but without limitation, between the heat exchangers 200 and the desiccant compartments 100, between the desiccant compartments 100 and the refrigerant reservoir 400. The system 100 may also include valves 650 throughout the piping 600 so that the flow of any fluids can be stopped or controlled in the individual piping 600. The valves 650 may be computer controlled such that once a particular desiccant compartment 100 is up to its maximum capacity of the mixture of heat transfer medium vapor and desiccant, that particular corresponding valve 650 is closed, and the corresponding valve 650 to next available desiccant compartment 100 (desiccant compartment 100 that is not up to its maximum capacity) is opened such that the process can continue. This process can continue such that the system 10 may be in operation for an extended period of time.

Figure 4:
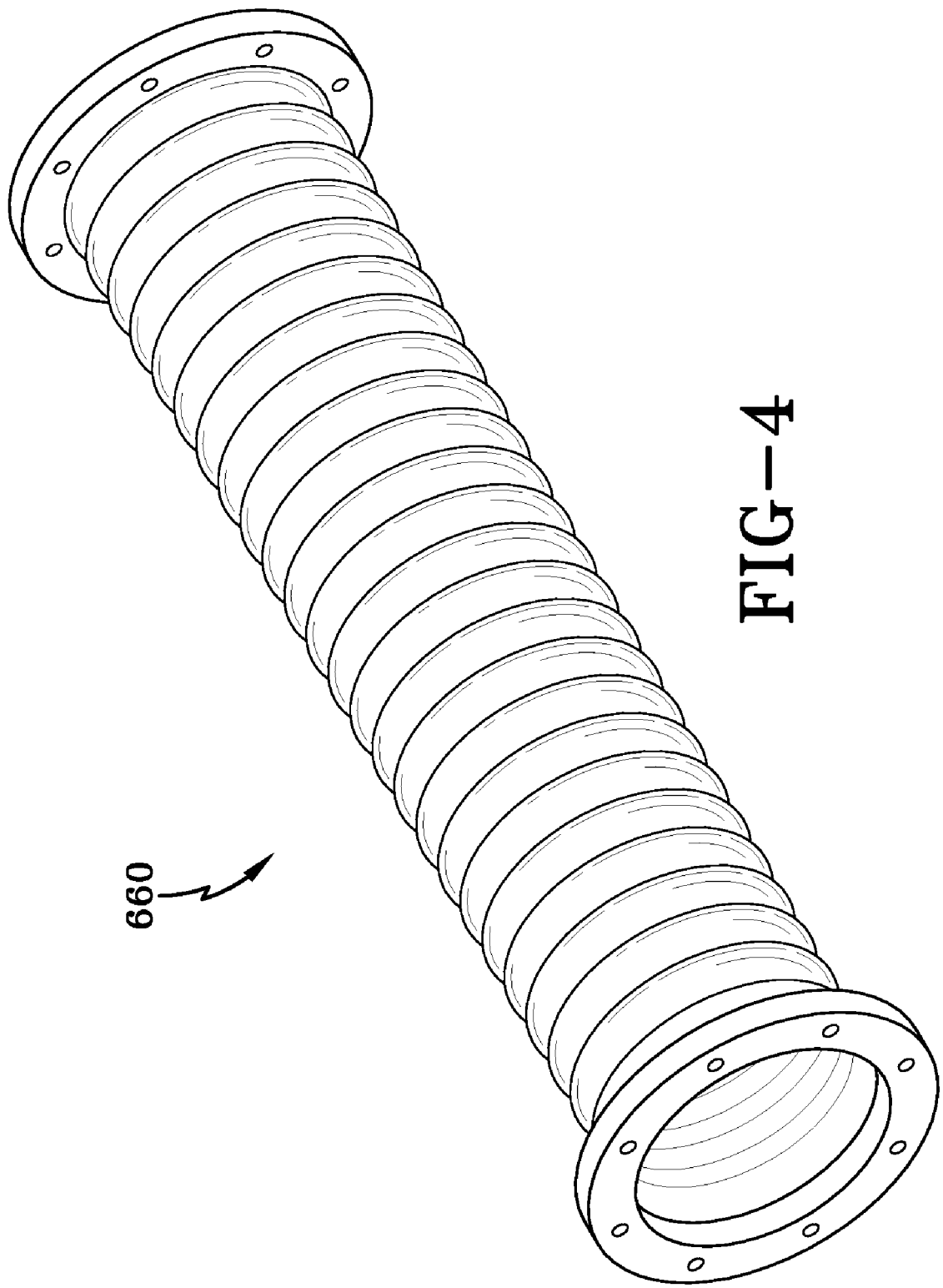

The associated piping 600 may be manufactured from any material that can be used to transport fluids. Particularly, there may be refrigerant piping 605 which carries the refrigerant 75 from the refrigerant reservoir 400 into the boiling chamber 205 of the heat exchanger 200. Vapor piping 610 carries the vapor from the boiling chamber 205 into the desiccant compartment 100. After desorption, desorption vapor piping 615 carries the vapor out of the desiccant compartment 100 through the coolant reservoir 500 and into the refrigerant reservoir 400. Coolant piping 620 carries the coolant 80 from the coolant reservoir 500 to the desiccant compartment 100 and into the compartment tubing 120. Coolant 80 exiting the compartment tubing 120 travels via coolant reservoir piping 625 into the coolant reservoir 500. The system 10 may include a refrigerant pump 700 and a coolant pump 750 for moving the refrigerant 75 and coolant 80 through the system. As shown in FIG. 1, the refrigerant pump 700 may be disposed along the refrigerant piping 605, while the coolant pump 750 may be disposed along the coolant piping 620. The pumps 700, 750 ensure that the refrigerant 75 and coolant 80 flow forward within the system. The pumps 700, 750 may be computer controlled to determine the appropriate speed for maximum efficiency of the system. The tubing 600 may include flexible tubing 660 as shown in FIG. 4. There may be flexible tubing 660 disposed at the refrigerant piping 605 and the vapor piping 610. As shown in FIG. 2, the desiccant cartridge 105 (as well as the desiccant compartment 100) may also include a piping inlet 115 that connects the desiccant cartridge 105 or desiccant compartment 100 to the desorption vapor piping 615 and the vapor piping 610. Valves 650 may be disposed along this piping in order to control appropriate flow and function.

The entire system 10 may be disposed within an enclosure, with a cooling duct 250 which directs the cooled air out of the enclosure toward and to the area that is to be cooled. In one of the embodiments, the air blower 300 directs the air toward and through each heat exchanger 200 and out the cooling duct 250, which directs the air toward the area to be cooled. In another embodiment, the heat exchangers 200 and air blower 300 may be disposed inside the cab of a vehicle, while the rest of the system 10 may be disposed on the chassis of the vehicle. In another embodiment, as shown in FIG. 1, the heat exchangers 200 and related piping may be disposed within a heat exchanger enclosure 150, where flexible tubing 660 is disposed right outside the heat exchanger enclosure 150 particularly at the vapor piping 610 and refrigerant piping 605 entrance areas into the heat exchanger enclosure 150. Alternatively, the system 10 may be within a combination of two or more enclosures.

In operation, as shown in FIG. 1, the heat exchangers 200 are filled with a refrigerant 75 (refrigerant 75 from the refrigerant reservoir 400 via refrigerant piping 605), preferably water, and each desiccant compartment 100 is filled with desiccant 50, preferably zeolite. The air blower 300 blows ambient air by or across the first heat exchanger 200A (the air passes through the air passage 225 of the first heat exchanger 200A) such that the blown air is initially cooled and dehumidified, the air then via air piping 630 is transported to and passes by or across the second heat exchanger 200B (via the air passage 225 of the second heat exchanger 200B) until the air passes by or across all the heat exchangers 200, and enters the area being cooled via an air or cooling duct 250. The area being cooled may be, but without limitation, a sleeping compartment in a truck cabin, a driver and passenger cabin, the interior of a tank, a ship's cabin or the like. There may be valves 650 along the piping to control which heat exchangers 200 are to be used. This may be controlled manually or via computer. In this process each heat exchanger 200, as well as the refrigerant 75 disposed within each heat exchanger 200, is warmed and boiled. Thermal energy increases and is transferred from the air to the refrigerant 75. The refrigerant 75 is then turned into vapor, and then the vapor is diffused from the heat exchangers 200 into one of the desiccant compartments 100 (via vapor piping 610). Each successive heat exchanger 200 cools the air further. The vapor enters one of the desiccant compartments 100 (the one that is determined to be in use) via vapor piping 610 and is adsorbed onto the desiccant 50 creating a mixture. The heat of adsorption is released through the compartment wall 110 of the desiccant compartment 100 or into the compartment tubing 120 to complete the transfer of energy through the system. Adsorption may be defined, but without limitation, as the ability of a substance to hold or concentrate gases or liquids upon its surface. An energy source is applied to the mixture such that the vapor and desiccant are separated. The preferred energy source is heat; however, any other type of energy source practicable may be used. If heat is used, it can be, but without limitation, external heat, solar heat, waste engine heat or heat from an auxiliary heating unit such as a diesel heater. This heat can be transferred to the desiccant 50 through compartment walls 110 or through compartment tubing 120. As shown in FIG. 1, the heat enters a heat inlet 705, then toward and into the compartment tubing 120 which passes inside the desiccant compartment 100 and heats the mixture and then exits through an exhaust 710. The heat may be exhaust heat from the vehicle or from diesel heater. There are valves 650 disposed along the piping 600 such the same pipes can be utilized for the coolant 80 and the heat.

The separated vapor (of the refrigerant 75) is then diffused toward the cooling reservoir 500 via desorption vapor piping 615. Via desorption vapor piping 615 the vapor passes from the desiccant compartment 100, then through the cooling reservoir 500 and through the coolant 80 within the coolant reservoir 500 where the vapor is cooled and condenses and then is transported to the refrigerant reservoir 400 to await being transported back to the first heat exchanger 200A to continue the cycle. After desorption (the desiccant 50 and vapor are separated) and the water vapor is transported from the desiccant compartment 100, coolant 80 from the coolant reservoir 500 via coolant piping 620 and compartment tubing 120 passes through the desiccant compartment 100 and cools the desiccant 50 disposed within the desiccant compartment 100. The coolant 80 is then transported via coolant reservoir piping 625 back to the coolant reservoir 500. Once the desiccant 50 is cooled to an appropriate temperature the desiccant compartment 100 is ready to be utilized again.

After the vapor is adsorbed onto the desiccant 50 in one of the desiccant compartments 100 and that particular desiccant compartment 100 is up to its maximum capacity for holding the mixture, vapor from the boiling chamber 205 of the last heat exchanger will enter the next desiccant compartment 100. This may be computer controlled via a valve system. The desiccant compartment 100 must be recharged and this is done by heating the mixture and creating desorption of vapor from the desiccant 50, then cooling the desiccant 50. Zeolite is the preferred desiccant 50 and desorption occurs when the zeolite reaches a certain temperature, and is unable to adsorb the vapor.

Each desiccant compartment 100 can be sized such that it can provide cooling for a time period allowing the previously used desiccant compartment 100 to recharge (i.e. the vapor to be separated from the desiccant 50 and diffused from the desiccant compartment 100 and the desiccant 50 cooled). Multiple desiccant compartments 100 may be utilized according to needs and requirements. Entry of the vapor into individual desiccant compartments 100 may be controlled by closing and opening corresponding valves 650. This may computer controlled.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. An air conditioning system, comprising:
   at least two desiccant compartments for holding a desiccant;
   at least one heat exchanger, the heat exchanger being able to be filled with a refrigerant;
   a blower for blowing ambient air by the heat exchanger such that the blown air is cooled and the heat exchanger is warmed such that thermal energy increases and is transferred from the air to the refrigerant causing the refrigerant to turn into vapor, the vapor is then diffused to one of the desiccant compartments such that the vapor is adsorbed onto the desiccant creating a mixture, an energy source is applied to the mixture such that the vapor and desiccant are separated;
   a refrigerant reservoir for supplying refrigerant to the heat exchangers;
   a coolant reservoir for supplying coolant for cooling the desiccant after the vapor and desiccant are separated.

2. The air conditioning system of claim 1, wherein the refrigerant is water.

3. The air conditioning system of claim 1, wherein the coolant is water.

4. The air conditioning system of claim 1, wherein the desiccant is zeolite.

5. The air conditioning system of claim 1, wherein the desiccant, coolant and refrigerant are non-toxic.

6. The air conditioning system of claim 1, wherein the energy source is heat.

7. The air conditioning system of claim 6, wherein the heat is from the group consisting of solar heat, waste engine heat and an auxiliary heating unit.

8. The air conditioning system of claim 1, wherein the desiccant compartments are cartridges that can be easily removed and attached.

9. The air conditioning system of claim 8, wherein the cartridges have a circular cross section.

10. The air conditioning system of claim 8, wherein the cartridges have a rectangular cross section.

11. An air conditioning system, comprising:
    at least two removable desiccant cartridges for holding a desiccant;
    at least two heat exchangers, the heat exchangers being able to be filled with liquid water;
    a blower for blowing ambient air by the heat exchangers such that the blown air is cooled and the heat exchangers are warmed such that thermal energy increases and is transferred from the air to the liquid water causing the liquid water to turn into water vapor, the water vapor is then diffused to one of the desiccant compartments such that the water vapor is adsorbed onto the desiccant creating a mixture, heat is applied to the mixture such that the water vapor and desiccant are separated; and
    a water reservoir for supplying water to the heat exchangers;
    a coolant reservoir for supplying coolant for cooling the desiccant after the vapor and desiccant are separated, after cooling the desiccant the coolant reenters the coolant reservoir for reuse, the water vapor that was separated from the desiccant passes through the coolant reservoir and into the coolant via piping such that the water vapor condenses to liquid and enters the refrigerant reservoir for reuse.

12. The air conditioning system of claim 11, wherein the coolant is water.

13. The air conditioning system of claim 11, wherein utilization of which desiccant compartment to use is computer controlled.

14. The air conditioning system of claim 11, wherein the system further includes associated piping such that the water and water vapor can travel within the system.

15. The air conditioning system of claim 11, wherein the system further includes valves placed along the piping such that the flow of water and the water vapor can be controlled.

16. The air conditioning system of claim 11, wherein the desiccant chamber comprises of inbuilt piping to serve as a conduit for heat and coolant to regulate the temperature of the desiccant.

17. The air conditioning system of claim 16, wherein the desiccant compartments include perforations.

18. An air conditioning system, comprising:
    at least two removable desiccant cartridges for holding a desiccant, each desiccant cartridge having internal compartment tubing and having a rectangular cross section;
    at least two heat exchangers, the heat exchangers being able to be filled with liquid water;
    a blower for blowing ambient air by the heat exchangers such that the blown air is cooled and the heat exchangers are warmed such that thermal energy increases and is transferred from the air to the liquid water causing the liquid water to turn into water vapor, the water vapor is then diffused to one of the desiccant compartments such that the water vapor is adsorbed onto the desiccant creating a mixture, heat is applied to the mixture via compartment tubing such that the water vapor and desiccant are separated; and
    a water reservoir for supplying water to the heat exchangers;
    a coolant reservoir for supplying coolant for cooling the desiccant after the vapor and desiccant are separated, the coolant traveling via the compartment tubing, after cooling the desiccant the coolant reenters the coolant reservoir for reuse, the water vapor that was separated from the desiccant passes through the coolant reservoir and into the coolant via piping such that the water vapor condenses to liquid and enters the refrigerant reservoir for reuse.

19. The air conditioning system of claim 18, wherein the compartment tubing is serpentine shaped.

20. The air conditioning system of claim 18, wherein the compartment tubing includes fins disposed around the circumference of the compartment tubing.

* * * * *